United States Patent
Chang et al.

(10) Patent No.: US 7,234,104 B2
(45) Date of Patent: Jun. 19, 2007

(54) SYSTEM AND METHOD FOR AUTHORING MULTIMEDIA CONTENTS DESCRIPTION METADATA

(75) Inventors: Hyun Sung Chang, Daejeon (KR); Seung Jun Yang, Suncheon (KR); Kyeongok Kang, Daejeon (KR); Jinwoong Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 365 days.

(21) Appl. No.: 10/741,843

(22) Filed: Dec. 19, 2003

(65) Prior Publication Data
US 2004/0133605 A1 Jul. 8, 2004

(30) Foreign Application Priority Data
Dec. 20, 2002 (KR) ............... 10-2002-0081682

(51) Int. Cl.
*G06F 17/21* (2006.01)
(52) U.S. Cl. ............................................. 715/500
(58) Field of Classification Search ................. 715/500
See application file for complete search history.

(56) References Cited

U.S. PATENT DOCUMENTS

| | | | |
|---|---|---|---|
| 6,426,778 B1 | 7/2002 | Valdez, Jr. | |
| 6,956,593 B1* | 10/2005 | Gupta et al. | 715/751 |
| 2002/0069218 A1* | 6/2002 | Sull et al. | 707/501.1 |
| 2003/0142124 A1* | 7/2003 | Takata et al. | 345/723 |
| 2004/0098398 A1* | 5/2004 | Ahn et al. | 707/100 |
| 2005/0038809 A1* | 2/2005 | Abajian et al. | 707/102 |
| 2005/0060741 A1* | 3/2005 | Tsutsui et al. | 725/32 |
| 2005/0081159 A1* | 4/2005 | Gupta et al. | 715/751 |
| 2005/0193014 A1* | 9/2005 | Prince | 707/104.1 |

FOREIGN PATENT DOCUMENTS

| | | |
|---|---|---|
| KR | 10-2001-0007692 | 8/2002 |
| WO | WO 01/69438 A2 | 9/2001 |

OTHER PUBLICATIONS

Blaise Lugeon and John R. Smith, Informative Report on the Development of an MPEG-7 Visual Annotation Tool, IBM T.J. Watson Research Center, May 31-Jun. 1, 2000.

* cited by examiner

*Primary Examiner*—Doug Hutton
(74) *Attorney, Agent, or Firm*—Blakely Sokoloff Taylor & Zafman

(57) ABSTRACT

Disclosed is a system for authoring metadata that describe multimedia contents. A storage device loads information on a currently edited metadata document so as to describe multimedia contents, and a metadata editor visualizes the loaded metadata document according to a predetermined method, and allows a user to edit the metadata document. A multimedia access reproducer accesses the input multimedia contents to reproduce corresponding multimedia contents, and an inter-media metadata interface links the multimedia access reproducer and the metadata editor to browse contents and effectively edit information relating to a specific interval of multimedia contents. A metadata output device outputs information on the loaded metadata document according to a predefined format.

3 Claims, 2 Drawing Sheets

---→ Metadata flows
——→ Multimedia contents flows

SYSTEM AND METHOD FOR AUTHORING MULTIMEDIA CONTENTS DESCRIPTION METADATA

CROSS REFERENCE TO RELATED APPLICATION

This application claims priority to and the benefit of Korea Patent Application No. 2002-81682 filed on Dec. 20, 2002 in the Korean Intellectual Property Office, the content of which is incorporated herein by reference.

BACKGROUND OF THE INVENTION (a) Field of the Invention

The present invention relates to a system and method for authoring multimedia contents description metadata. More specifically, the present invention relates to a system and method for effectively authoring multimedia contents description metadata through visualization of the metadata and linkage with the multimedia contents.

(b) Description of the Related Art

Metadata for multimedia contents are used so as to manage, retrieve, and browse a huge amount of multimedia contents under the multimedia environments including digital broadcasting and the Internet.

However, since the conventional metadata authoring system does not aim at describing multimedia contents, the metadata authoring system does not consider linkage with the multimedia contents, and recent authoring development states in consideration of the linkage focus on the metadata components directly linked with contents according to a specific method.

Hence, the conventional metadata authoring system has difficulty in visualizing and editing the metadata that describe the whole multimedia contents.

SUMMARY OF THE INVENTION

It is an advantage of the present invention to provide a metadata authoring system and method for linking various types of metadata information on multimedia contents with multimedia data, and editing the same.

In one aspect of the present invention, a system for authoring metadata for describing multimedia contents comprises: a storage device for loading information of a currently authored metadata document so as to describe input multimedia contents; a metadata editor for visualizing the loaded metadata document according to a predetermined method, and allowing a user to edit the metadata document; a multimedia access reproducer for accessing the input multimedia contents, and reproducing the corresponding multimedia contents; an inter-media metadata interface for linking the multimedia access reproducer and the metadata editor, and allowing to browse contents and effectively edit information that relates to a specific interval of multimedia data; and a metadata output device for outputting the loaded metadata document information according to a predefined format when the authoring is finished.

In another aspect of the present invention, a method for authoring metadata for describing multimedia contents comprises: (a) loading information on a metadata document of earlier authoring so as to describe input multimedia contents; (b) visualizing the metadata document loaded in the storage device according to a predetermined method; and (c) allowing a user to use the visualized metadata document and edit the metadata document in linkage with the corresponding multimedia contents.

In still another aspect of the present invention, a recording medium for storing a software program for authoring metadata for describing multimedia contents comprises: a metadata editing module for visualizing a metadata document loaded in a storage device according to a predetermined method, and allowing a user to edit the metadata document; a multimedia access reproducing module for accessing the input multimedia contents and reproducing corresponding multimedia contents; an inter-media metadata interface module for linking the multimedia access reproducing module and the metadata editing module to browse contents and effectively edit information relating to a specific interval of the multimedia contents; and a metadata output module for outputting metadata document information loaded in the storage device according to a predefined format when the authoring is finished.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
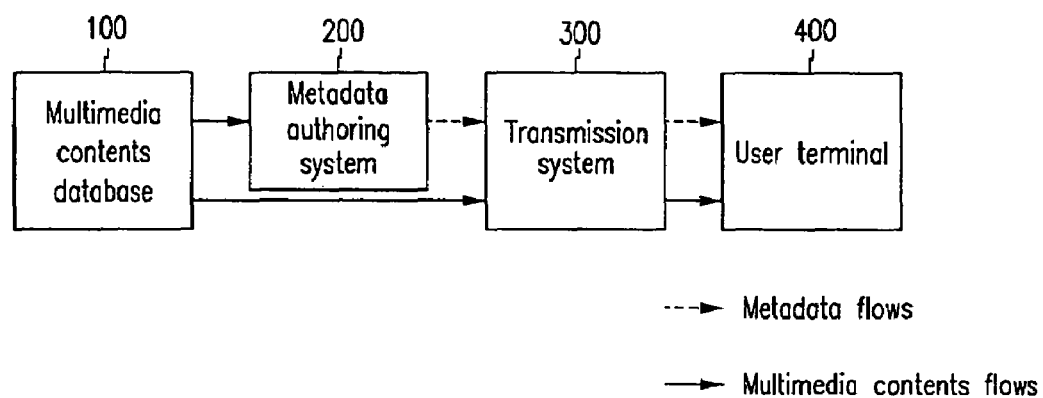
FIG. 1 shows a configuration diagram of a multimedia service environment for using the multimedia contents description metadata according to a preferred embodiment of the present invention.

FIG. 1 shows a whole configured system of a multimedia service environment for using the multimedia contents description metadata according to a preferred embodiment of the present invention.

As shown, the multimedia system comprises a multimedia contents database 100, a metadata authoring system 200, a transmission system 300, and a user terminal 400.

The metadata authoring system 200 receives multimedia contents from the multimedia contents database 100 or another system, authors multimedia contents description metadata, and transmits them to the transmission system 300. In this instance, the multimedia contents description metadata include program information, temporal segment information, summary configuration information, and annotation information of the multimedia contents.

The transmission system 300 transmits the multimedia data authored by the metadata authoring system 200 to the user terminal 400 by using an appropriate protocol according to a specific transmission environment such as a broadcast or the Internet.

The user terminal 400 displays the multimedia contents transmitted through the transmission system 300 to the user, and supports the user so that he may view a summary of the multimedia contents or retrieve desired segments to view desired portions by using the metadata information transmitted together with the multimedia contents.

Figure 2:
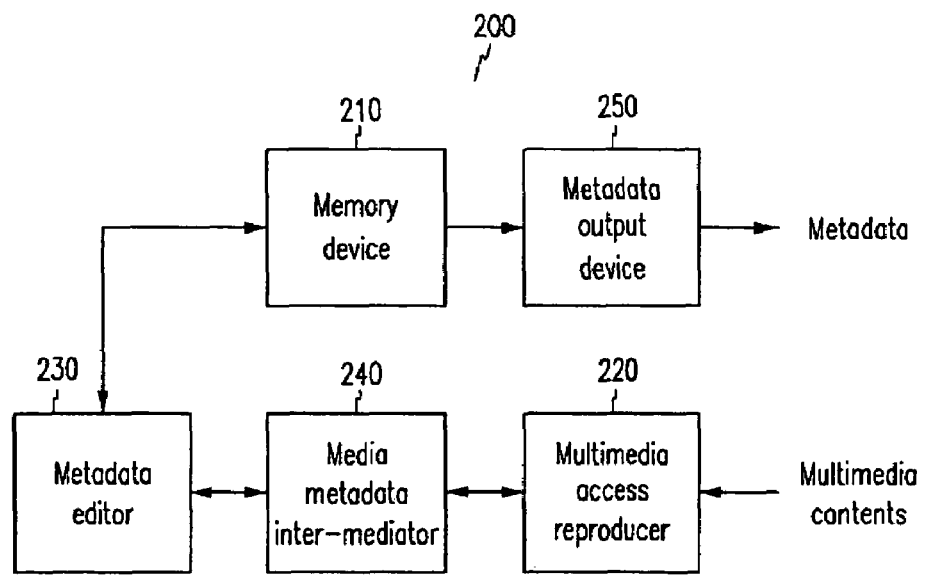
FIG. 2 shows a detailed block diagram of a multimedia contents description metadata authoring system according to a preferred embodiment of the present invention.

FIG. 2 shows a detailed multimedia contents description metadata authoring system according to a preferred embodiment of the present invention.

As shown, the metadata authoring system comprises a storage device 210, a multimedia access reproducer 220, a metadata editor 230, an inter-media-metadata interface 240, and a metadata output device 250.

The storage device 210 stores information on the metadata documents which are currently authored.

The multimedia access reproducer 220 receives multimedia contents to which a metadata authoring process will be applied, and accesses a specific interval of the multimedia contents, or reproduces the multimedia contents.

The metadata editor 230 refers to the metadata documents loaded in the storage device 210, visualizes the metadata documents according to a predefined rule, and edits the corresponding contents by receiving the user's inputs.

For example, the metadata editor 230 places the metadata information on a sheet-/page (for visualization) that is defined from HTML (hyper text markup language) and a plurality of command objects which can be inserted into the HTML. When the user edits the contents of the page, the metadata editor 230 receives instructions on the contents edited by using the command objects, and modifies the corresponding portion of the metadata document loaded in the storage device 210. The metadata author uses a predefined page (for visualization), additionally makes the page, or selects one of the previously made pages according to his taste.

The metadata editor 230 has a user interface for visualizing the time axis on the multimedia contents, and when the contents of metadata relate to a specific interval of the multimedia contents, the metadata editor 230 represents the contents on the time axis of the multimedia contents.

The inter-media-metadata interface 240 interfaces between the multimedia access reproducer 220 and the metadata editor 230 to allow the multimedia access reproducer 220 to browse multimedia contents by using the metadata currently edited by the metadata editor 230. In detail, when the contents of the metadata currently edited by the metadata editor 230 are related to a specific interval of the multimedia contents, the inter-media-metadata interface 240 allows the multimedia access reproducer 220 to access the corresponding interval of the multimedia contents, and reproduce the multimedia contents.

Also, the inter-media-metadata interface 240 allows to select a specific interval of the multimedia contents through a visualized user interface of the multimedia contents on the time axis, and to input metadata information that relates to the specific interval.

The metadata output device 250 outputs finally edited metadata information stored in the storage device 210 according to a predefined format when authoring the metadata is finished. The format of the output metadata can be represented by the XML (extensible markup language) according to the national and international standards for multimedia contents description, and the metadata can be output in the binary format defined by the national and international standards by further compressing the XML.

The metadata editor 230, the inter-media-metadata interface 240, the multimedia access reproducer 220, and the metadata output device 250 can be realized as software modules or hardware units.

Figure 3:
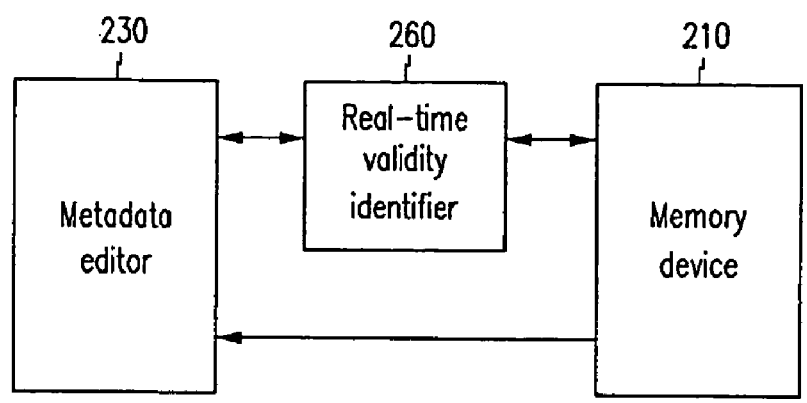
FIG. 3 shows an extended diagram for the multimedia contents description metadata authoring system of FIG. 2 to identify validity in real-time according to editing the metadata.

FIG. 3 shows an extended diagram of an interface between the storage device 210 and the metadata editor 230 shown in FIG. 2.

When an event of editing the contents of the metadata is generated by the user through the metadata editor 230, a real-time validity identifier 260 refers to metadata schema information on the edited components to check whether editing results are valid. When the editing results are found to be valid, the real-time validity identifier 260 changes metadata information loaded in the storage device, and when they are not valid, the real-time validity identifier 260 notifies the user with an appropriate error message through the metadata editor 230.

The metadata schema information can be stored as a separately described document format, and loaded in the storage device 210 according to a selection by the user.

Figure 4:
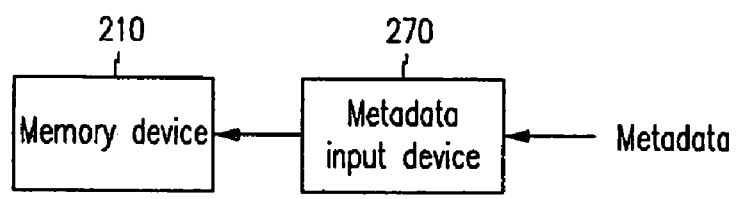
FIG. 4 shows an extended diagram for the multimedia contents description metadata authoring system of FIG. 2 to re-edit the conventionally authored metadata.

FIG. 4 shows an extended diagram for the multimedia contents description metadata authoring system of FIG. 2 to re-edit the conventionally authored metadata.

As shown, a metadata input device 270 identifies validity of the metadata input for re-editing, and loads the identified metadata information in the storage device 210. When an invalid portion is found after identifying the validity, the metadata input device 270 extracts the valid portion and loads the same in the storage device.

According to the present invention, the multimedia contents description metadata are effectively authored since various types of metadata information on the multimedia contents can be edited while being linked with the multimedia data.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for authoring metadata for describing multimedia contents, comprising:
   (a) loading a previously authored metadata document that describes corresponding multimedia contents into a storage device;
   (b) displaying the metadata document loaded in the storage device according to a predetermined method;
   (c) accessing and reproducing the corresponding multimedia contents;
   (d) allowing a user to browse the multimedia contents and effectively edit a portion of the metadata document that relates to a specific interval of the multimedia contents;
   (e) loading metadata schema information via the storage device; and
   (f) checking the validity of the metadata document, extracting valid portions and loading the valid portions into the storage device,
wherein the storage device loads metadata schema information, and a metadata input device extracts valid portions and loads the valid portions into the storage device when invalid portions are found after checking the validity of the metadata document.

2. The method of claim 1, wherein (b) comprises displaying metadata from the metadata document in a visualization sheet including all or part of the metadata.

3. The method of claim 1, wherein (d) comprises allowing the user to access a specific interval of multimedia contents and reproduce multimedia contents when the contents of the metadata relate to the specific interval of the multimedia contents to thereby edit the metadata document.

* * * * *